March 18, 1924.

V. J. HARRIS

CONTROL LEVER SILENCER

Filed March 24, 1921

1,487,380

Vernon J. Harris, INVENTOR.

BY Ralzemond A. Parker, ATTORNEY.

Patented Mar. 18, 1924.

1,487,380

UNITED STATES PATENT OFFICE.

VERNON J. HARRIS, OF DETROIT, MICHIGAN.

CONTROL-LEVER SILENCER.

Application filed March 24, 1921. Serial No. 455,354.

*To all whom it may concern:*

Be it known that I, VERNON J. HARRIS, a citizen of the United States, residing at Detroit, county of Wayne, State of Michigan, have invented a certain new and useful Improvement in Control-Lever Silencers, and declare the following to be a full, clear, and exact description of the same, such as will enable others skilled in the art to which it pertains to make and use the same, reference being had to the accompanying drawings, which form a part of this specification.

My invention relates to silencing mechanism adapted to prevent rattle and wobble of the gear shift lever in automobile gear sets where the lever mounting is of the type here shown.

As a matter of nomenclature in the present application, I prefer to call the gear shifting lever "the hand control lever" and the housing which forms a ball seat fulcrum therefor, "the hand control lever housing".

In the type of hand control levers, in connection with which my device is adapted to be used, the control lever is fulcrumed in a ball seat and more or less play is provided as there must be sufficient clearance to permit freedom of movement of the control lever in shifting the gears from one speed to another. This looseness of mounting and permitted clearance produces an almost continuous wobble or vibration of the control lever and consequent rattle when the car is being driven. This rattle is accentuated when the car is driven at high speed and over an uneven roadway. As the average driver will run a car the greater part of the time in high speed, I provide means adapted to engage the hand control lever when in high speed only, in such a manner as to prevent wobble of the lever.

The object of my invention is to provide a spring bearing member adapted to engage the power arm of the hand control lever, when said lever is shifted into high speed position, in such a manner as to exert yielding side thrust thereon, tending to exert, in connection with the fulcrum bearing and the bearing exerted on the work arm by the partition of the gearset gateway, a three-point bearing on said lever, effectively preventing the wobble and reducing to a minimum the vibration thereof during the time it is in high speed position.

These and other objects of the invention, together with details of construction, will more fully appear from the following description, appended claims and accompanying drawings, in which:

Figure 1:
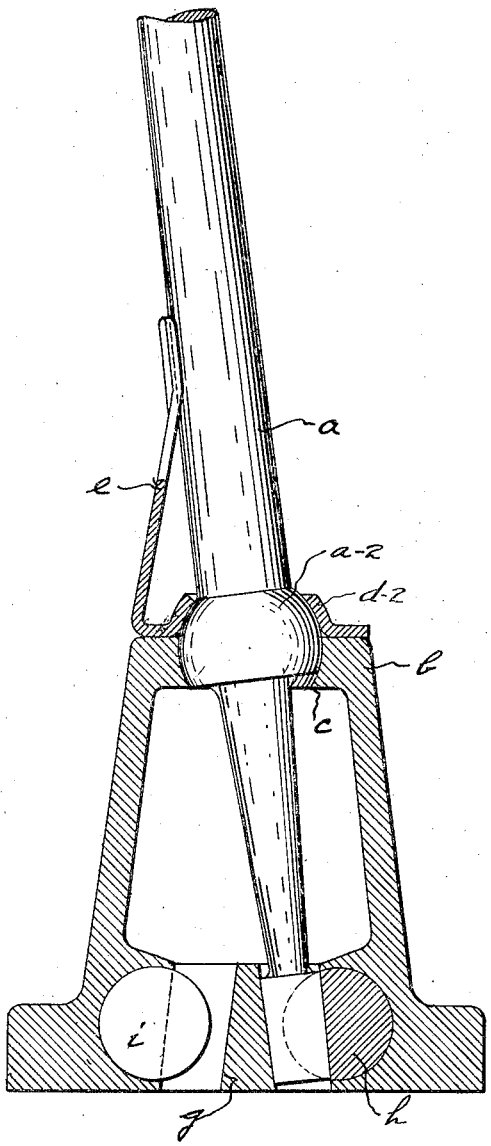
Figure 1 is a vertical section thru the housing showing the control lever in elevation.

Other devices intended to accomplish the same purpose have been previously provided, for example, a device adapted to exert upward, yielding pressure on said control lever tending to hold it securely in its provided ball seat. This device, however, is operative at all times while my device is merely operative when the lever is in high speed position, and in other speeds it is possible to provide for full freedom of movement and sufficient clearance to facilitate easy shifting of the lever.

In the drawings, let $a$ indicate the hand control lever; $b$ the hand control lever housing which is so shaped as at $c$ to form the lower portion of a ball seat fulcrum bearing for the ball $a^2$ of the hand lever. In conventional construction to-day, there would be provided a hand control lever ball collar secured to the upper surface of the hand control lever housing, and which would surround said lever holding the same in position. I prefer, however, to remove this collar and adapt my spring bearing member so as to serve the additional purpose thereof. It is apparent, however, that the collar might be left in position and my spring bearing member secured thereabove.

I provide a spring bearing member which comprises a collar plate $d$ and an upwardly-extending bearing member $e$. The collar plate $d$ is adapted to encircle the control lever and is flared as at $d^2$, around the edge of the central opening thru the plate, so as to form the upper portion of the ball seat. This collar plate is adapted to be secured to the control lever housing by screws, or other similar means, passing thru the openings $f$. When the collar plate is in position it provides a ball seat fulcrum for the control lever in connection with the control lever housing.

At the lower end of the work arm the control lever is provided with a bearing adapted to engage gear shifter shafts to shift said shafts, shifting the change speed gears as may be desired. There is provided a fixed partition member g, which forms a bearing on the side of the control lever opposite the side which engages with the shifter shaft, so as to maintain such engagement. The shifter shafts shown in Fig. 1 are indicated as h and i. Let h indicate the high speed shaft.

Figure 2:
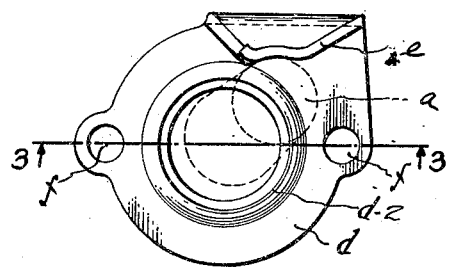
Fig. 2 is a plan of my spring bearing member.
Figure 3:
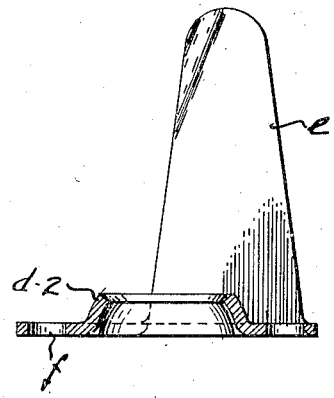
Fig. 3 is a section on the line 3—3 of Fig. 2.

The spring bearing member e is bent slightly inwardly and is so positioned that when the hand control lever is shifted into high-speed position, the lever is engaged by the bearing member, as shown in Figs. 1 and 2. This bearing member is slightly curved so that the control lever will move easily back into position and the bearing member will slightly embrace said control lever so as to retain its engagement therewith. The action of the spring bearing member e is of such a character as to exert a yielding side thrust on the control lever tending to move the same about its fulcrum point as a pivot and serve to hold the lower end of the work arm of said lever towards the partition g in the gearset gateway. A three point bearing is therefore exerted on the control lever in such a manner as to prevent wobble of the lever when in high speed position.

This upwardly extending spring member e is likewise so positioned that the control lever will engage the shifter shaft and move the same sufficiently for the lower end of the lever to have been engaged by the fixed partition member g before the power arm of the lever is engaged by the spring bearing member e. As the control lever is moved fully into high speed position it will also move into the position relative the bearing member e as shown in Fig. 2 of the drawing.

In the operation of this device it will therefore be seen that whenever the control lever is moved into high speed position a side pressure will be exerted thereon tending to prevent its wobble or movement about its fulcrum point.

What I claim is:

1. In a motor vehicle, in combination, a change speed gear control lever, a fulcrum supporting said lever intermediate the ends thereof for universal movement, change speed gear mechanism so positioned as to be engaged by said lever below said fulcrum, a spring bearing member adapted to be engaged by said lever above said fulcrum when in a determined gear shift position to limit the vibration of said lever.

2. In a gear shift mechanism, in combination, the hand control lever, the housing which provides a ball seat fulcrum for said lever intermediate its ends, an upwardly-extending spring bearing member carried by said housing adapted to exert pressure sideways on said lever about said fulcrum point as a pivot when the lever is in the high speed position.

3. In a gear shift mechanism, in combination, the hand control lever, the housing in which said control lever is fulcrumed, a spring bearing member extending upwardly from the housing, adapted to yieldingly engage said lever in such a manner as to limit vibration thereof when the lever is in high-speed position.

4. In a motor vehicle, in combination with the change speed gear shift mechanism positioned below the floor of the vehicle, a hand control lever fulcrumed intermediate its ends, and the work arm of which lever is adapted to engage such gear shift mechanism below the floor of the vehicle, and means for engaging the power arm of said lever above the floor of the vehicle when the lever is in the high speed position only to limit the vibration thereof.

5. In a motor vehicle, in combination with change-speed gear shift mechanism positioned below the floor of the vehicle, a hand control lever pivoted intermediate its ends for universal movement and extending below the floor of the vehicle to engage for operation said gear shift mechanism, a bearing member extending upwardly from the floor of the vehicle adapted to engage said control lever and exert side thrust thereon and prevent oscillation thereof when said lever has been moved to a determined gear shift position.

In testimony whereof I sign this specification.

VERNON J. HARRIS.